April 22, 1930.  A. M. ALEXANDRESCU  1,755,945
ADJUSTABLE SILENT GEAR
Filed Nov. 16, 1927  3 Sheets-Sheet 1
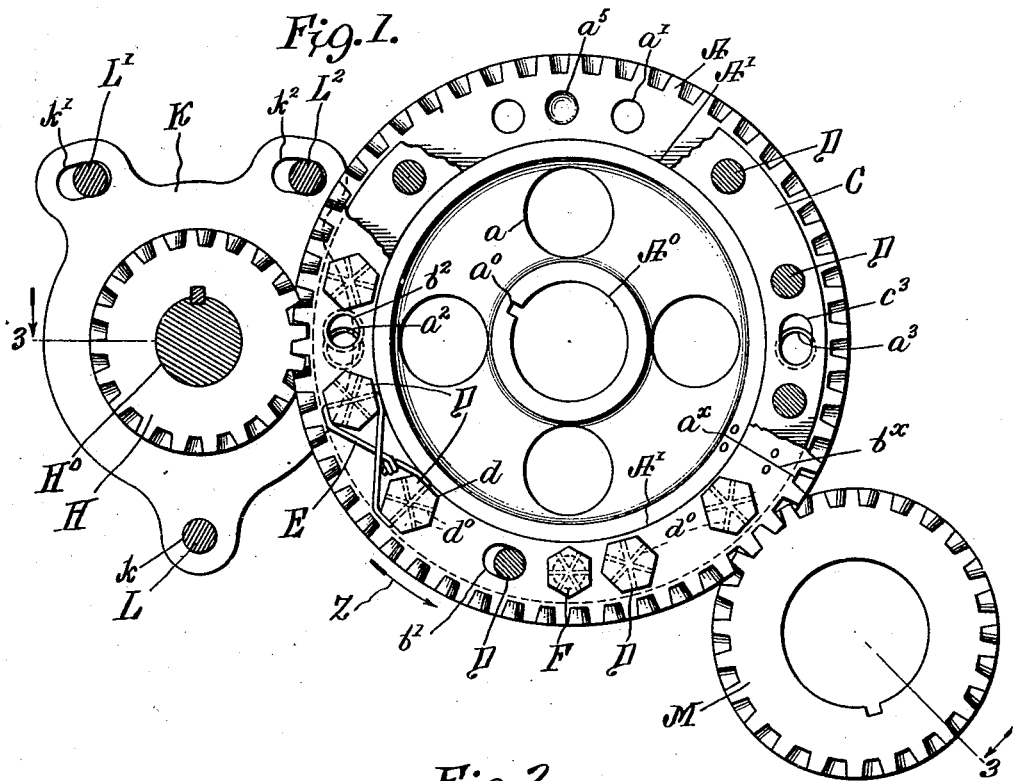
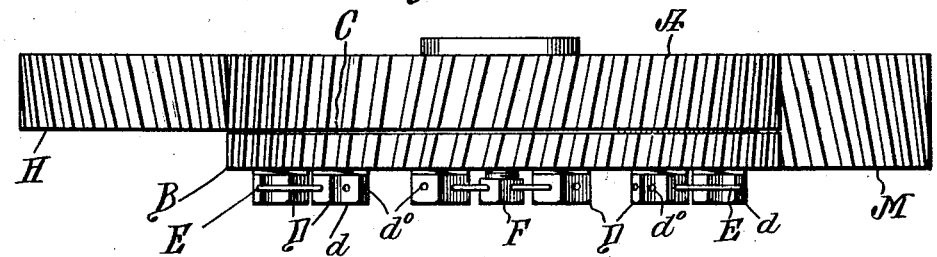
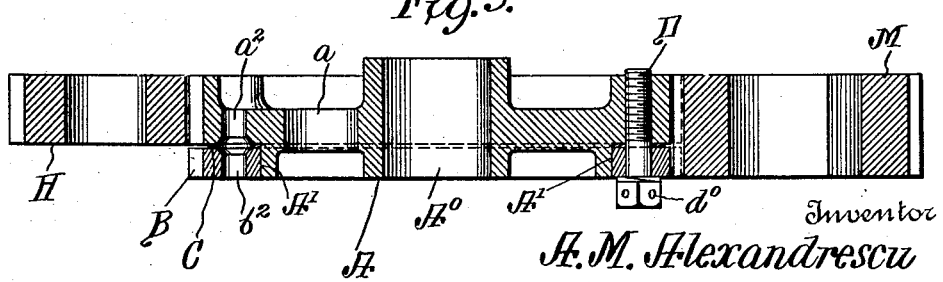
Inventor
A. M. Alexandrescu
by Wilkinson & Giusta
Attorneys.

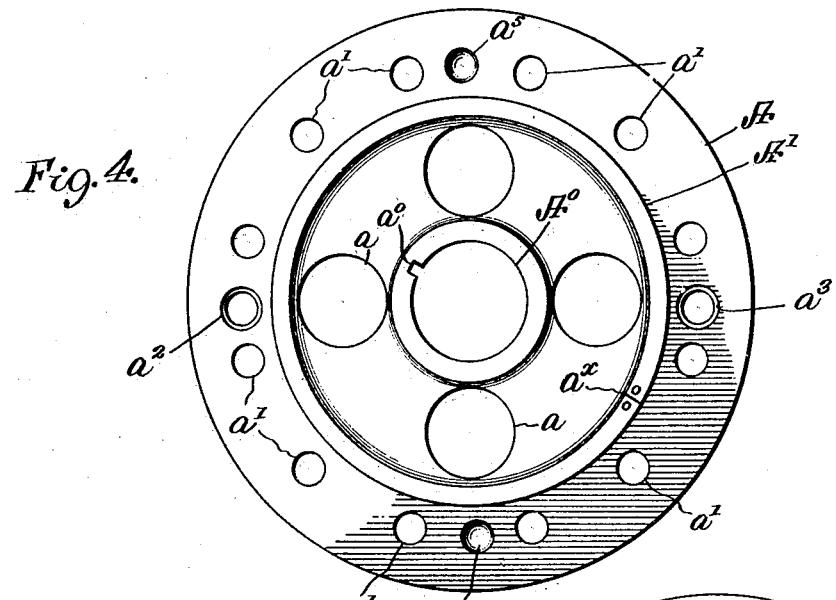
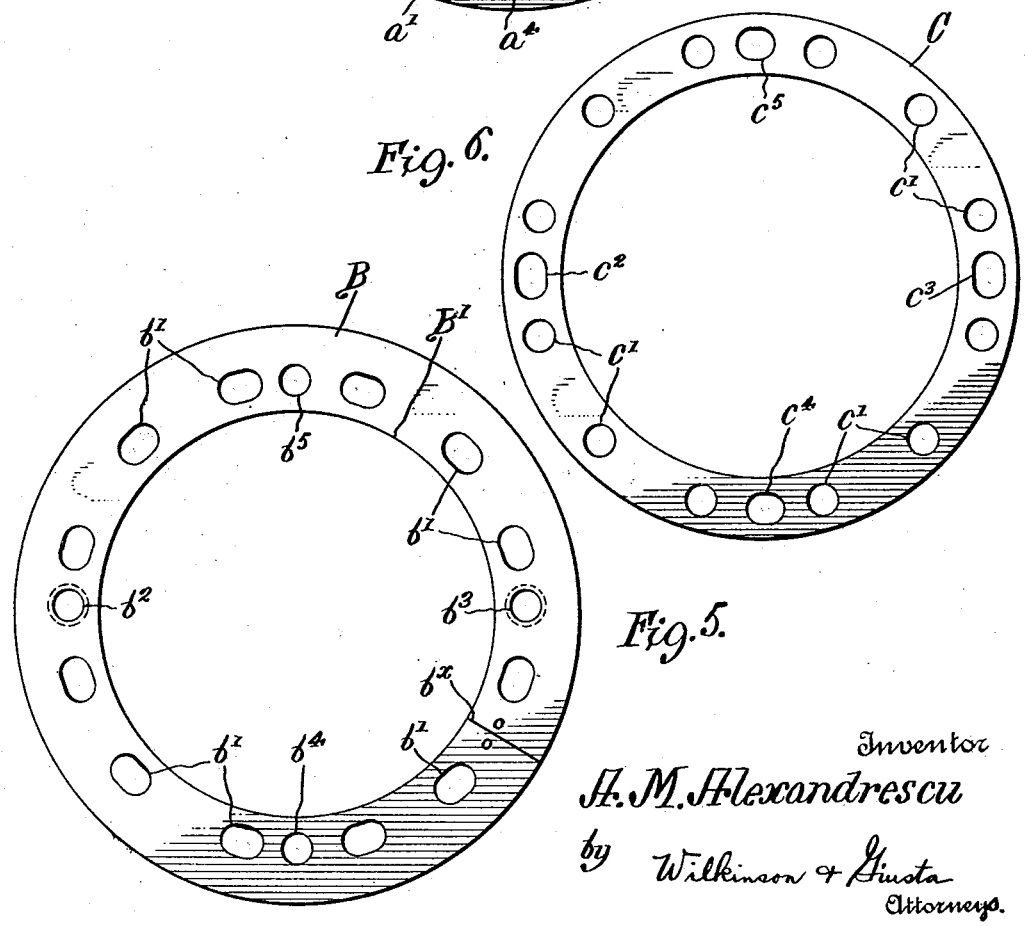

April 22, 1930.   A. M. ALEXANDRESCU   1,755,945
ADJUSTABLE SILENT GEAR
Filed Nov. 16, 1927   3 Sheets-Sheet 3
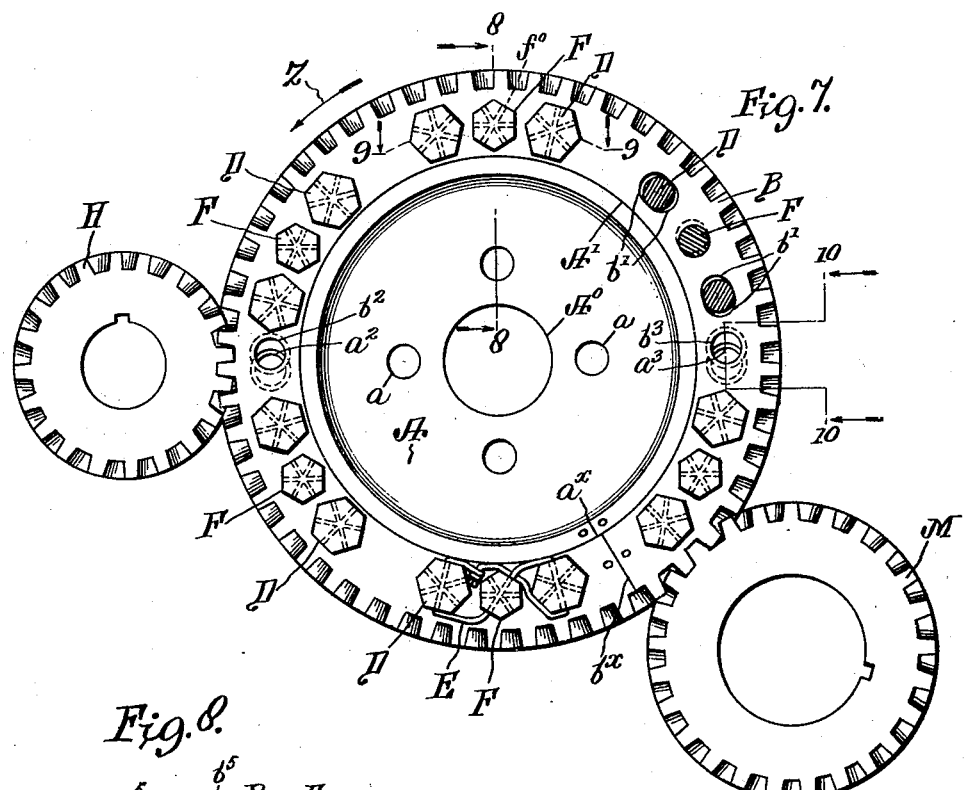
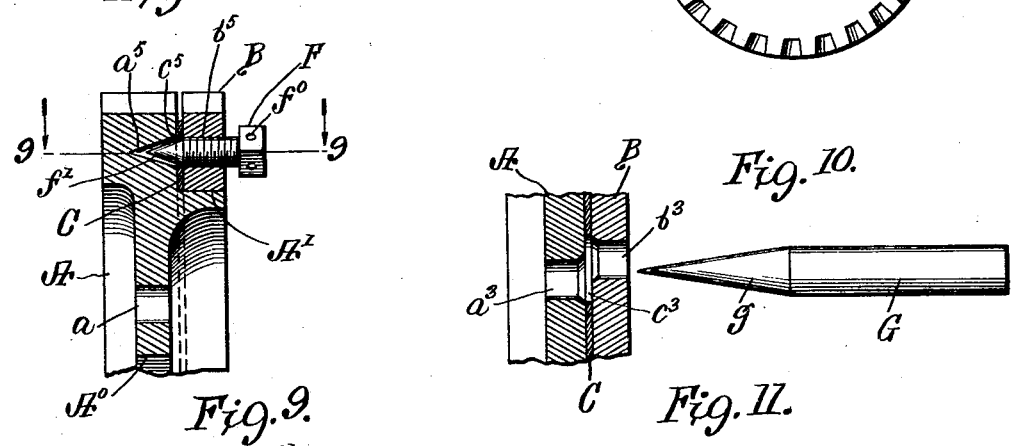
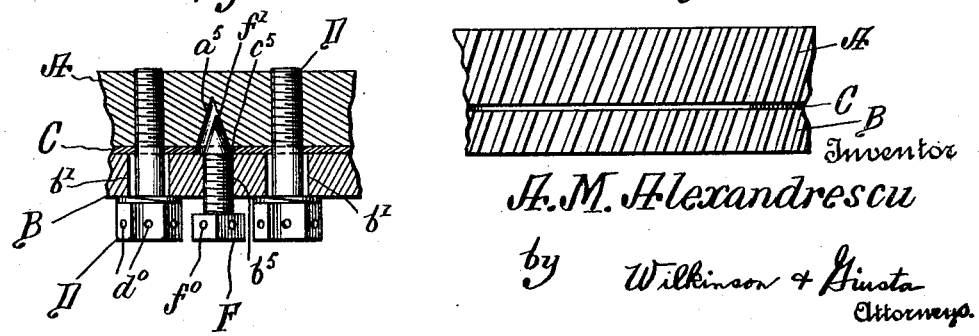

Patented Apr. 22, 1930

1,755,945

UNITED STATES PATENT OFFICE

ALEXANDER M. ALEXANDRESCU, OF CLEVELAND, OHIO

ADJUSTABLE SILENT GEAR

Application filed November 16, 1927. Serial No. 233,692.

My present invention relates to improvements in adjustable silent gears and it is intended to provide an arrangement of gears by which the lost motion between the teeth of contiguous gears is, in a large measure, if not wholly, avoided, and, therefore, the noise resulting from the loose engagement of the gear teeth is, in a large measure, avoided.

In the old type of gear now generally used, after so many miles the gears wear down and have to be replaced. This means not only loss of use of the car, but material expense to the owner.

The greatest advantage of my gears is that they can be adjusted taking out the ringing, rattling and pounding, besides keeping motor in perfect time; and they wear much longer than other gears now generally in use.

This effect of silencing the gears is supplemented by the combining, with the parts of the main gear, a silencing gasket of fiber, felt, soft metal, or other suitable material which will deaden the sound.

My invention will be more fully understood after reference to the accompanying drawings in which like parts are indicated by like reference symbols throughout the similar views, and in which, Figure 1 is a side view of the driving and driven main gear, the main adjustable silencing gear interposed between the two, the parts being broken away.

Figure 2 is a plan view of the device shown in Figure 1, and shows the gearing, but the shafts of the several gears are omitted.

Figure 3 shows a section along the broken line 3—3 of Figure 1 and looking in the direction of the arrows.

Figure 4 is a detail showing the body portion of the main gear with the gear teeth omitted, or before the gear teeth have been cut thereon.

Figure 5 is a detail showing the adjustable ring cooperating with the body portion, as will be hereinafter described, but before the teeth have been cut on same.

Figure 6 is a detail showing the interposed sound deadening gasket.

Figure 7 shows a modification in which the number of lock screw bolts is increased over that shown in Figure 1, this arrangement being for heavier work than that shown in Figure 1.

Figure 8 shows a section along the line 8—8 of Figure 7, and illustrates the mode of adjusting the toothed ring to the main body of the gear.

Figure 9 shows a section along the line 9—9 of Figures 7 and 8, and illustrates the method of locking the adjustable ring to the main body portion of the silent gear.

Figure 10 shows a section along the line 10—10 of Figure 7 with the adjusting punch about to be inserted into the adjusting apertures, and, Figure 11 is a fragmentary plan view showing the adjustment of the gear teeth on the main gear after there has been more or less wear in the parts.

Referring first to Figures 1 to 6, A represents the body portion of the main gear to which the adjustable ring B bearing gear teeth is adjustably attached, as will be hereinafter described, and firmly gripped between these two, is the sound deadening ring C. The body portion A of the main gear is provided with a cylindrical shoulder $A'$ and with an opening for the shaft $A^0$ having the key slot $a^0$, see Figure 4. The weight of this part of the gear may be diminished by providing the usual openings $a$. Exterior to the shoulder $A'$ and spaced equidistant radially therefrom are the bolt holes $a'$, the adjusting holes $a^2$ and $a^3$ and the tapered sockets $a^4$ and $a^5$. Adjacent to the shoulder $A'$, I provide a timing line $a^x$ to facilitate the adjustment of the parts as will be hereinafter described.

The deadening ring C is slipped over the shoulder $A'$ and is held in place by the bolts D which pass through the bolt holes $c'$ in this ring and which bolt holes fit snugly over the bolts. This ring C is provided with elongated apertures $c^2$ and $c^3$ to register with the adjusting perforations $a^2$ and $a^3$ on the member A and with elongated slots $c^4$ and $c^5$ to register with the corresponding slots of the member A. The toothed ring B is slipped over the shoulder $A'$ with the bolts D passing through the elongated bolt holes $a'$. This ring is provided with adjusting perforations $b^2$ and $b^3$ to approximately register with the adjusting perforations of the member A and also with the internally screw threaded openings $b^4$ and $b^5$ to receive the locking screw bolts F, as will be hereinafter described.

When the parts are assembled, and ready for use, the deadening ring C is clamped firmly between the members A and B which are securely held together by the screw bolts D, and the heads of these bolts may be locked together as by means of the wire fasteners E, whose ends engage in the recesses $d^0$.

When the main gear comes from the factory, the teeth should be cut with a back lash of 5/1000 of an inch.

When installed in motor, or other machinery, then the adjustment should be brought forward as indicated by the arrow Z in Figure 1 until the back lash is all taken up. Then clamp the bolts D and lock the screws F, and wire up as at E.

The above arrangement saves time for the manufacturer by preventing him from installing several sets of gears until the right gear is obtained. It also happens that gears at times are cut undersize, and then these gears have to be scrapped because they are junk. But with this type of gear, the back lash can be taken up and this saves time and loss of material.

Now, as the main gear is used for any length of time, the teeth will inevitably wear, and there will be lost motion between the gear teeth, especially between the teeth of the main gear and the driven gear M, and this adjustment is taken care of by a slight movement of the toothed ring B which is effected as follows:

First, unlock the heads of the bolts D and ease up on all of these bolts, then force the guide punch G, shown in Figure 10, into the adjusting openings $b^3$ and $a^3$ until the teeth on the ring B are in alignment with the teeth on the pinion A. This will only require very small adjustment, and such adjustment is illustrated in Figure 11, and may be noted by comparison between the timing lines $a^x$ and $b^x$, as shown in Figure 1. After this adjustment has been made, tighten up again on the bolts D, and screw in on the bolts F; then lock the heads of these bolts together to prevent any unscrewing of these bolts, as by the wire fasteners E, as shown in Figures 1, 2 and 7.

In Figures 1 and 7, I have shown the usual arrangement of crank shaft gear, intermediate gear and driven gear, as shown in automobiles; but, obviously, the main or intermediate gear may be used in connection with any other arrangement of gearing in which the driving is effected by means of a high speed engine.

In Figure 1, I have shown the shaft $H^0$ of the gear H journalled in a bracket K, which is pivoted, as at $k$, to the bolt L, and is provided at the upper end with elongated slots $k'$ and $k^2$ engaging the bolts $L'$ and $L^2$, whereby this bracket may be adjusted, if desired; but this is not a part of my present invention and will not be herein described.

While I have described one embodiment of the invention in its preferred form, it will be obvious that various changes might be made in the construction, combination, and arrangement of parts which might be used without departing from the spirit of my invention, and I do not intend to limit the invention to such details except as pointed out in the claim.

Having thus described my invention, what I claim and desire to secure by Letters Patent of the United States is:—

An adjustable transmission gear comprising a main gear body having a toothed periphery and provided with spaced threaded transverse openings with a tapered socket between such openings, a sound deadening ring fitted against the side of the main body gear and having openings of a size to accurately register with the threaded openings of the main gear and provided with an elongated slot registering with the socket, a toothed ring mounted for circumferential adjustment along side said main gear and against the sound deadening ring and having circumferentially elongated slots registering with the threaded openings in the main gear and with the openings in the sound deadening ring and having between such elongated slots a transversely extending threaded opening in substantial alignment with said tapered socket, headed bolts having threaded end portions for taking into the threads of the openings of the main gear and having plain shanks extending through the circumferentially elongated slots of the gear ring, a headed screw having a tapered shank threaded into the threaded opening of the ring gear and provided with a tapered end portion for fitting into the tapered socket, and means for securing together the adjacent heads of the two bolts and intermediate screw.

ALEXANDER M. ALEXANDRESCU.